Jan. 11, 1955
T. R. KOMLINE
2,699,260
FILTER MEDIA
Filed July 27, 1948
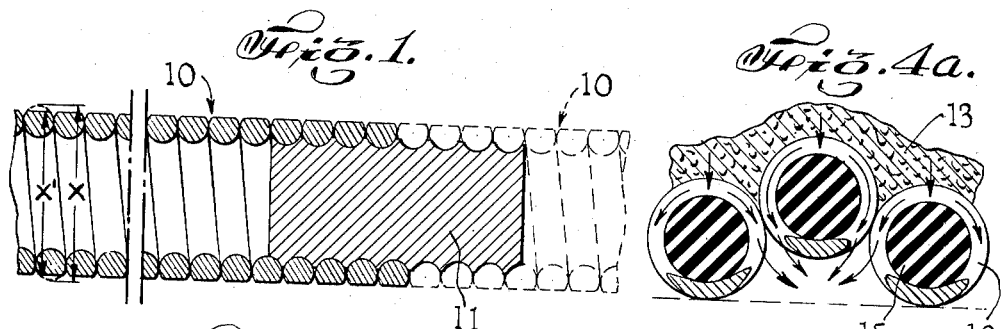
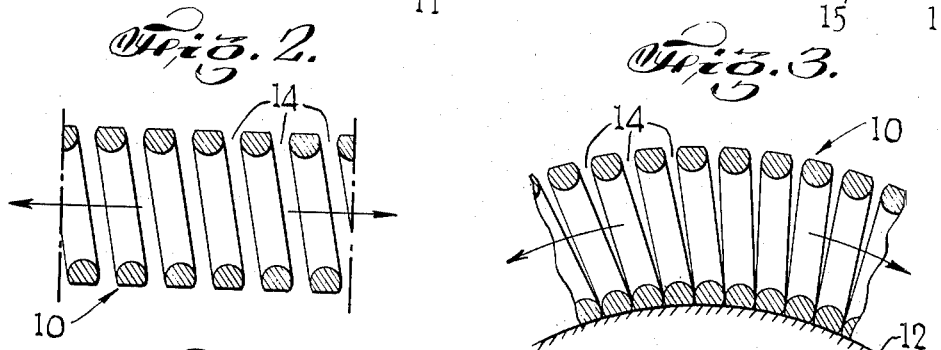
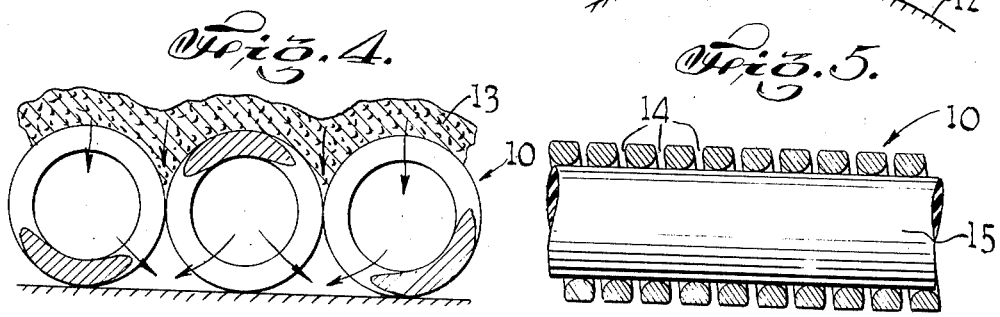
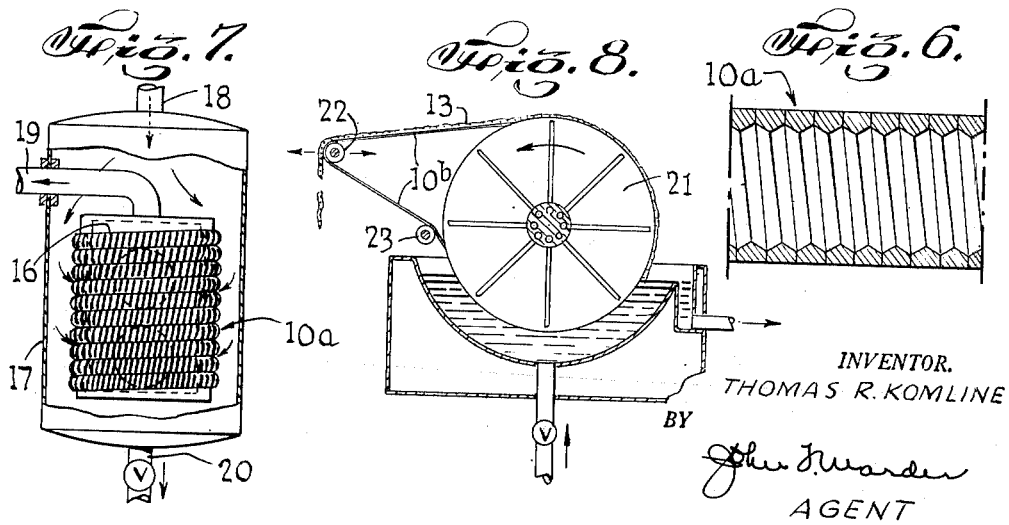
INVENTOR.
THOMAS R. KOMLINE
BY
AGENT

United States Patent Office 2,699,260
Patented Jan. 11, 1955

2,699,260

FILTER MEDIA

Thomas R. Komline, Ridgewood, N. J.

Application July 27, 1948, Serial No. 40,897

1 Claim. (Cl. 210—169)

This invention relates to improvements in media for the filtration of solids from liquids and has to do particularly with filter media applicable to the separation of solids from industrial and sewage waste materials, although it is not so limited and may be used with filters for other purposes.

The present application discloses subject matter of a similar nature to that described in my copending application, Serial Number 32,484 now Patent Number 2,652,927, filed June 11, 1948.

In the science of the separation of solids from liquids by filtration, filters may be classified for comparison into three broad groups, each of which employs a somewhat different method of operation with a different style of apparatus. In the order of decreasing performance with regard to the degree of separation of the solids from the liquid, these groups are (a) pressure filtration, (b) vacuum filtration, and (c) mechanical straining.

Pressure filter equipment usually consists of a stationary filter medium disposed within a filter housing and is used for batch filtering, the medium for pressure filters being a single element or a group of elements in series for straining out solids, pressure being used to advance the material through the medium. Woven cloth material is used in some pressure filters, generally placed in circular or square frames set closely together. In water purification, sand or other granular material in cylindrical vessels may be utilized as a cloth substitute. Various chemicals and filter-aid may be used with the filtered material for the additional properties of killing bacteria or removing infilterable color particles, or for assisting to prevent blinding of the filter medium.

Vacuum filtration is carried out with a sizable vacuum drum covered with a filter web and partly submerged in a vat of material. The vacuum filtering operation is substantially continuous and, as the drum rotates, the solid material is scraped or otherwise conveyed away from the medium. As in pressure filtration, chemicals, adsorbants, or filter-aid may be used in vacuum filtration, however, the filtration operation itself is not quite so critical as in pressure filtration and these additional materials may not be employed. The filter media for vacuum filters is usually a woven cloth or a series of contiguous cords spaced in corduroy fashion over the drum, the submergence of the drum in the vat of material varying in accordance with the de-watering characteristics of the sludge or slurry being filtered.

Strainers are used for coarse separation, as for example, for saveells in the paper industry and rotating screens for municipal sewage and industrial waste treatment. Mechanical strainers, as the name implies, are usually a series of bars or gratings or a coarse metal screen, depending upon the characteristics of the material to be filtered.

A shortcoming of all woven materials for pressure or vacuum filtration is that blinding of the openings in the woven material occurs which is difficult of cleaning, decreasing the rate of filtration and necessitating manual or special hydraulic cleaning apparatus. If the openings are made larger, a loss of solids occurs rendering the filtrate unusable in many industrial operations or causing pollution in working with municipal or industrial wastes. An example of this condition is in caustic-lime separations where the caustic must be clear to be reusable. In paper mill operation, an 80 mesh screen will effectively remove most of the fibre but, since 80 mesh clogs readily, most paper mill operators employ a 60 mesh screen with some attendant fibre loss.

Vacuum filtration through interstices of cords on a rotary drum, the cords being removed from the drum for cake conveyance and discharge as well as for cord cleaning, has proven to be a satisfactory operation, but several disadvantages have been noted with textile cords. It is first of all, difficult to maintain cord size; likewise, cotton as a textile cord material has been found to be very destructible by the various chemical agents in filtration operations and is subject to mildew and rot; furthermore, when applied to industrial filtration operations the solid loss in filtrate is quite high, thus rendering textile cords generally unsatisfactory as a filter medium.

The present application has for its principal object to provide a medium which is applicable to all of the above types of filtration and which overcomes many of the deficiencies in the media heretofore described. In its physical embodiment the invention comprehends, in part, a filter medium of helically coiled springs, the filtrate passages being provided between the spring coils. The mathematical and physical properties of a coil spring are such that it may be readily adapted for filtration by pressure or vacuum or mechanical screening and the springs may be extended or shortened to vary the filtrate passage area. As an example, we may consider the use of a closely coiled spring of .072" diameter wire, 12" long, .432" outside diameter. Such a spring will have approximately 168 coils or loops and when extended 2" beyond its original 12" length, a narrow helical slot .012" wide and approximately 189" long results. The spring openings or separations between the coils thus have the property of being very closely adjustable by this extension principle or by training the spring over a cylindrical surface. The physical and metallurgical properties of spring wire are such that this circular helical slot will be remarkably uniform and the available materials are compatible with most any filter problem. Springs as a filter medium may also be used in numerous forms as, for example, endless moving filaments. As the helical slot or opening clogs the spring may be mechanically extended for cleaning and closed back for further filtration. A large number of endless springs may be employed on a rotatable compartmentalized drum for the purpose of making a web whereby the filtering operation may be continuous. As an added advantage a filler may be used inside of the spring coils to prevent inter-compartment leakage.

The drawings are descriptive of filter springs constructed in accordance with my invention, in which Figure 1 is a fragmentary longitudinal cross-section view of one type of a filter spring including a connection stud used to join the ends of like springs, Figure 2 is a cross-section view of a portion of a filter spring with the helical coils extended to provide filtration interstices, Figure 3 is a view similar to that of Figure 2 showing the provision of filtering interstices by training the spring medium over a curved surface, Figure 4 is a transverse cross-section view through a series of contiguous spring filaments showing the path of flow of effluent and the build up of solid material above the filter medium, Figure 4a is a view similar to Figure 4 wherein a filler is employed within the spring media, Figure 5 is a fragmentary longitudinal cross-section view of a coiled spring having a filler material, Figure 6 is a view similar to Figure 1 showing a fragment of a filter spring wound from an alternative spring wire shape, Figure 7 is a diagrammatic view showing a typical pressure filter employing a filter spring according to my invention, and Figure 8 is a diagrammatic view showing a continuous vacuum drum filter employing the filter spring medium of my invention.

Referring to Figure 1, I use, as a filtering medium, coil spring 10 which has been closely wound from circular section metal wire of chosen physical characteristics and which is subsequently ground on its outside surface in a suitable grinding machine to the extent that approximately 30% of the spring wire stock has been removed. Starting with an original wound spring of diameter $x$, the spring is reduced by grinding to a diameter $x'$. It is not ground to the extent that the wires have a semicircular section to produce a true cylindrical configuration for the reason that the sharp mating corners would have a tendency to blind quickly during filtering operations and yet it does have a sufficiently smooth surface so that it will fit closely between guides or so that two coils may be arranged contiguously with a minimum of spacing therebetween.

For pressure filters or for mechanical strainers, one or several spring coils of prescribed size may make up the required area of filter medium. For vacuum filters, where the filter medium is in the form of a web, it is desirable to employ a group of long filaments in parallel, each filament being an endless coil. Furthermore, in vacuum filtration, the spring coil may be plugged or partitioned into short lengths, preferably not over 15" long, so that it may be used with a compartmental drum and so that there will be no loss of vacuum between compartments. Accordingly, I use a series of short lengths secured together by a plug 11 which is threaded to fit the inside of the spring for each length of spring. The plug engages approximately three coils of each abutting spring end and is made as a tight fit so that, by the inherent characteristics of coil springs, it becomes substantially self-locking when installed in position. It is important that the spring be made from circular section wire and subsequently ground rather than by winding a pre-formed partially round wire since the wire is apt to skew during winding and present an irregular outside surface and thus permit interstices between springs or between a spring and its guide.

Separation of the individual spring coils for filtration is provided either as exaggerated in Figure 2 by mechanically extending the coils through axial tension in the direction of the arrows or, as in Figure 3, by training the coils over a cylindrical surface 12. In either case, the filtrate passages or interstices 14 will be provided between the helical coils, through which effluent may pass but solids of filtration may not pass. Figure 4 shows the path of flow of effluent material using a plurality of springs in parallel on a drum surface, first between the coils at the top leaving residual solid material 13 on the surface thereof and then downwardly within the springs and finally out at the bottom. There is no substantial flow of liquid between contiguous springs although slight leakage may occur at that location depending upon the accuracy with which the springs are ground and upon the extent to which they are crowded together. In any case, the ground cylindrical exterior surface of the spring coils prevents any appreciable loss of solids between springs which would be objectionable in filtering operations.

Figure 5 shows the additional inclusion of a filler material 15 within the spring tangent with the coils on the inner surface. This filler may be a resilient, deformable composition such as synthetic rubber, which will permit flow along the spring coils along the periphery of the filler, as shown in Figure 4a but which will restrict longitudinal flow within the filter element. Such material should be chosen to be impervious to attack by the filtrate. If desired, the filler may be a pervious material such as fibre glass or granular charcoal to assist in the filtration efficiency in application where the spring filament need not be sealed against longitudinal flow. Such filler materials may be chosen for adsorbing qualities, or to otherwise aid in the elimination of infilterable solids.

As an alternative to the circular section spring wire of Figure 1, a substitute pre-formed wire section such as that of Figure 6 may be coiled into a spring 10a to perform like functions to the spring of Figure 1, but requiring little or no machining subsequent to coiling. In the use of a pre-formed wire section, the shape should be such that a substantial side shoulder will be provided so that the wire material will coil without any skewing to give an irregular outside surface and permit loss of solids between contiguous filter elements.

Figures 7 and 8 show the possibilities of applying the coil spring filter medium of my invention to a pressure type filter and a vacuum drum filter respectively. In Figure 7 the spring element 10a is a long helical coil wrapped around and fixed to a pervious cylindrical element 16 which is suitably supported within a pressure tank 17. Material to be filtered enters the pressure filter tank 17 through a pipe line 18 and filters in passing between the coils of the spring element, the effluent flowing to the interior of element 16, to be exhausted through a discharge line 19 leaving solids on the outside. Back flushing and drainage, as is well known in the art of pressure filtration through the line 20 will renew the filter efficiency after a batch filtering operation. The separation of the helical coils of the spring is made in accordance with the filter requirements and the application takes advantages of the additional separation gained by disposing the spring over a cylindrical surface. In the vacuum filter application of Figure 8, parallel springs 10b are wound in endless fashion over a rotating drum 21 partially immersed in a tank of material to be filtered, a discharge roller 22, and a return guide roller 23. The drum is divided into separate vacuum compartments and separation between spring coils is made by horizontal adjustment of the discharge roller in the direction of the arrows. Additional separation is gained by reason of the fact that the spring elements are trained over the cylindrical drum during the filtering operation and discharge is enhanced by separation of the spring coils as the element passes over the discharge roller. As the drum 21 rotates, effluent is drawn through the springs, leaving solids 13 on the surface thereof to be conveyed away and discharged as the springs traverse discharge roller.

Having thus described my invention, I claim:

Filtering apparatus for a drum filter of the type employing an axially rotatable drum and a discharge roller remotely spaced therefrom over which a filter web is looped for filtering and for the discharge of accumulated solids, comprising, in combination, a filter web constructed in the form of an endless belt and composed of a plurality of flexible, endless filaments in parallel, contiguous relationship; each filament consisting of helical spring coils between which effluent may pass, but solids of filtration may not pass, a flexible, resilient, fluid impervious filler within the spring coils to restrict the flow of effluent, and guides associated with the filter drum to maintain the said relationship of the filaments.

References Cited in the file of this patent

UNITED STATES PATENTS

| Number | Name | Date |
|---|---|---|
| 360,751 | Arnao | Apr. 5, 1887 |
| 559,440 | Conrader | May 5, 1896 |
| 765,182 | King | July 19, 1904 |
| 1,214,911 | Granz | Feb. 6, 1917 |
| 1,371,513 | Nickerson | Mar. 15, 1921 |
| 1,378,507 | Wiegand | May 17, 1921 |
| 1,876,123 | Wright | Sept. 6, 1932 |
| 2,190,965 | Wood | Feb. 20, 1940 |
| 2,217,833 | Chapman | Oct. 15, 1940 |
| 2,247,460 | Wright | July 1, 1941 |
| 2,308,865 | Davis | Jan. 19, 1943 |
| 2,399,887 | Olson | May 7, 1946 |
| 2,422,647 | Vokes | June 17, 1947 |
| 2,429,419 | Magill | Oct. 21, 1947 |